April 14, 1942.  H. J. McC. BURDICK  2,279,298
VALVE
Original Filed Aug. 6, 1938   2 Sheets-Sheet 1
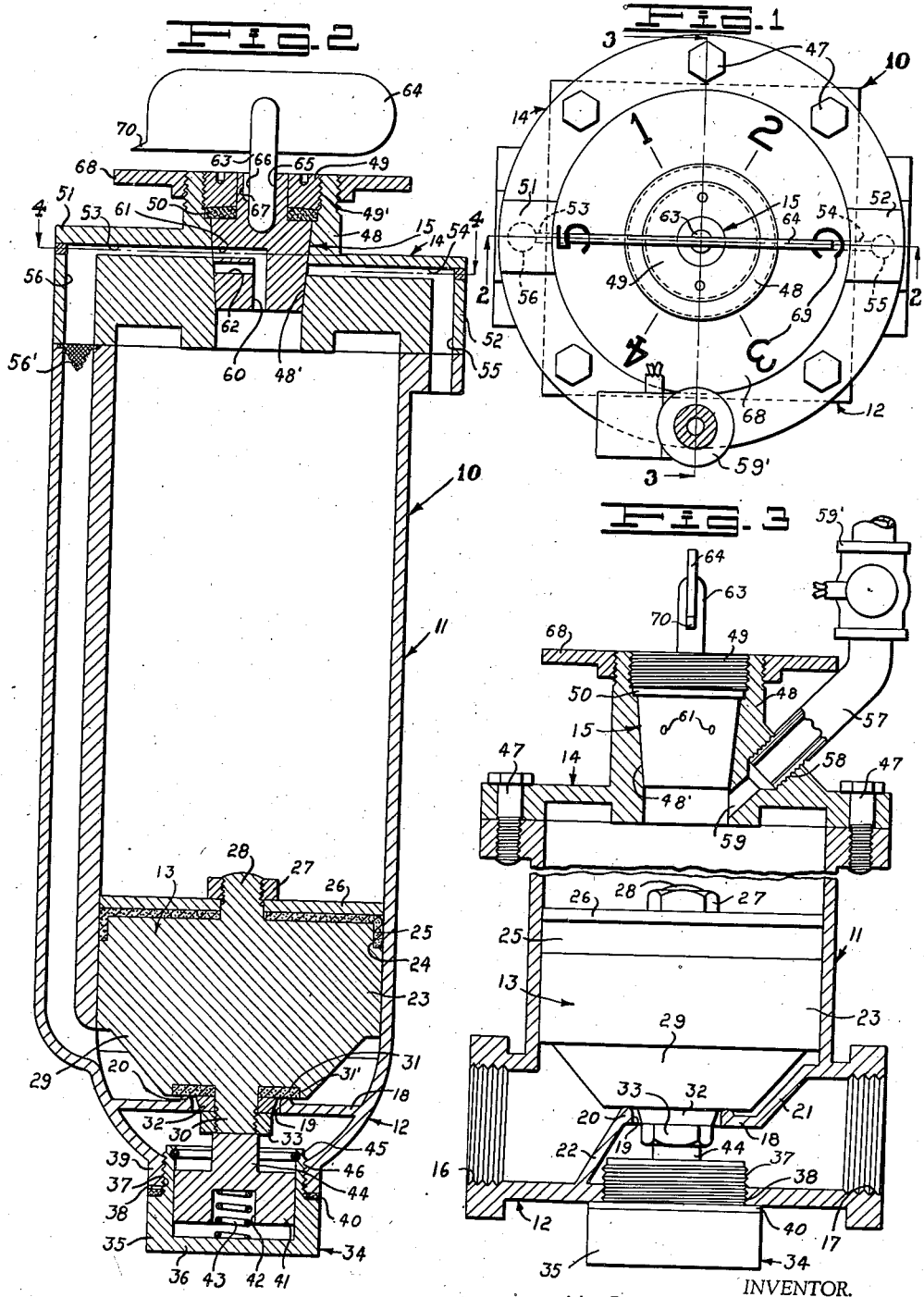
INVENTOR.
H. J. McCOMBS BURDICK
BY
ATTORNEY.

April 14, 1942.    H. J. McC. BURDICK    2,279,298
VALVE
Original Filed Aug. 6, 1938    2 Sheets-Sheet 2

INVENTOR.
H. J. McCOMBS BURDICK
BY
ATTORNEY.

Patented Apr. 14, 1942

2,279,298

UNITED STATES PATENT OFFICE 2,279,298

VALVE

Harry J. McCombs Burdick, Anaheim, Calif.

Original application August 6, 1938, Serial No. 223,480, now Patent No. 2,219,761, dated October 29, 1940. Divided and this application September 30, 1940, Serial No. 358,972

3 Claims. (Cl. 137—139)

This invention relates to improvements in fluid control devices.

The general object of the invention is to provide a novel time controlled valve adapted to control automatically the flow of a fluid.

Another object of the invention is to provide a novel adjustable time controlled valve which will stop the flow after a predetermined length of time.

Another object of the invention is to provide a valve having an actuating cylinder and piston with novel means for controlling the movement of the piston within the cylinder.

Another object of the invention is to provide a novel control member for a time valve.

Other objects and advantages of my invention will be apparent from the following description taken in connection with the accompanying drawings, wherein:

Fig. 1 is a top plan view of my improved valve;

Fig. 2 is a section taken on line 2—2 Fig. 1;

Fig. 3 is a fragmentary section taken on line 3—3 Fig. 1;

Figure 4:
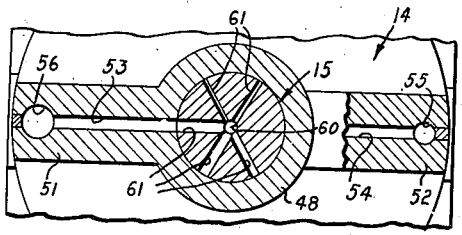
Fig. 4 is a fragmentary section taken on line 4—4 Fig. 2.
Figure 5:
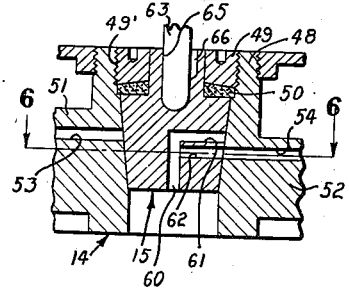
Fig. 5 is a fragmentary section showing the parts in another position.
Figure 6:
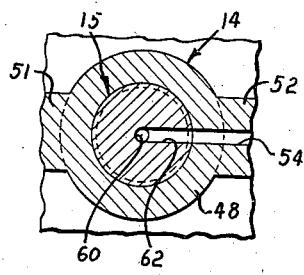
Fig. 6 is a fragmentary section taken on line 6—6 Fig. 5.

This application is a division of my prior application Serial No. 223,480, filed August 6, 1938, now Patent No. 2,219,761, granted October 29, 1940.

Referring to the drawings by reference characters I have shown my invention as embodied in a time controlled valve device which is indicated generally at 10.

As shown the device 10 includes a hollow cylindrical body portion 11 having an integral cylindrical bottom portion 12 the axis of which is substantially perpendicular to the axis of the body portion. The device 10 further includes a piston 13 slidable within the hollow body portion 11, and a cap portion 14 including a manually operated plug valve 15.

The bottom portion 12 has a fluid inlet aperture 16 and an outlet aperture 17, both these apertures being adapted to be connected to a pipe line. A wall 18 having an aperture 19 with a raised rim 20 is disposed within the bottom portion 12, diagonal walls 21 and 22 being connected thereto as shown in Fig. 3.

The piston 13 includes a main body 23 with a reduced upper portion 24 which accommodates a packing cup 25 secured by a plate 26 which is in turn secured by a nut 27 engaging a threaded boss 28 on the body 23. The body 23 has a lower tapered portion 29 terminating in a depending threaded boss 30. A packing ring 31 adapted to engage the raised rim 20 of the aperture 19 is disposed around the boss 30 in a groove 31 in the body 23 being secured therein by a tapered collar 32 and a nut 33. It will be seen that when the ring 31 engages the rim 20 passage from the inlet aperture 16 to the outlet aperture 17 is prevented.

A dash-pot assembly 34 is shown located below the aperture 19 and includes a hollow cylinder 35 with a closed lower end 36 and an upper reduced threaded portion 37 engaging an aperture 38 in a depending hub 39 on the bottom 12, packing 40 being disposed therebetween. A piston 41 is disposed within the cylinder 35 and has a lower central recess 42 accommodating a spring 43 and an upper boss 44 adapted to engage the lower end of the boss 30 on the piston 13. A snap ring 45 engaging a groove 46 within the cylinder 35 limits the travel of the piston 41.

The cap 14 is secured to the body portion 11 by cap screws 47 and includes an upstanding hub 48 having a tapered bore 48' engaged by the plug valve 15 which is held therein by a retaining collar 49 engaging a threaded portion 49' of the bore 48' packing 50 being disposed between the collar and the valve. A pair of opposed radial arms 51 and 52 are disposed on the top face of the cap 14 and have conduits 53 and 54 therein respectively.

The conduit 54 communicates with a vertical conduit 55 opening to the atmosphere while the conduit 53 communicates with a vertical conduit 56 and may include a screen 56' which leads from the lower portion of the hollow cylindrical body portion 11. As shown in Fig. 2 the conduit 54 is on a somewhat lower level than the conduit 53. A conduit 57 (Fig. 3) threadedly engages an aperture 58 communicating with the interior of the valve device 10 as at 59. The conduit 57 may be closed by a suitable valve 59' such as a solenoid operated valve.

The plug valve 15 has an axial conduit 60 opening through the underface thereof and at its upper end communicating with a plurality of radial coplanar conduits 61 on the same level as the conduit 53. As shown in Fig. 4 the conduits 61 vary in diameter. A radial conduit 62 communicates with the axial conduit 60 at the level of the conduit 54.

The shank 63 of a removable controller 64 slidably engages an aperture 65 in the plug valve 15, a key 66 integral with the shank engaging a keyway 67. A dial 68 having suitable indicia 69 thereon may be screwed to or otherwise mounted on the hub 48, a pointer 70 on the controller 64 indicating the positions of the various radial conduits in the plug valve 15.

In use the device 10 is connected in a pipe line, as for instance, a sprinkler system, it being desirable to operate the sprinklers for a certain predetermined period of time. The plug valve 15 is rotated so that the radial conduit 62 communicates with the conduit 54 thus affording free passage between the interior of the body portion 11 and the atmosphere. The fluid entering the inlet aperture 16 urges the piston 13 upwardly discharging fluid in the upper part of the hollow body portion 11 via the conduits 60, 54, and 55 and filling the chamber below the piston 13. This operation opens the aperture 19 allowing free passage of fluid through the outlet aperture 17. The plug valve 15 is then rotated so that one of the radial conduits 61 communicates with the conduit 53.

Fluid will now flow up the conduit 56 and slowly discharge into the hollow body portion 11 above the piston 13 via the conduits 53, 61 and 60, and allow the piston 13 to drop until the aperture 19 is again closed stopping the fluid flow. Near the end of the downward stroke the flow is slowly decreased by the action of the tapered sleeve 32, while the final movement of the piston is retarded by the action of the dashpot 34. This slow checking of the fluid flow is desirable to eliminate the dangers of a "water hammer" effect.

If it is desired to control the valve device 10 remotely the preliminary discharge of the fluid above the piston may be effected by opening the solenoid operated valve (not shown) on the conduit 57 by closing a switch in the solenoid circuit. This may be done manually or by a suitable clock device. It will be understood that the capacity of the conduits 57 and 59 must exceed the capacity of the largest conduit 61 in order to fully raise the piston 13.

Figure 7:
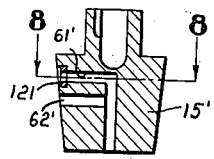
Fig. 7 is a central section of a modified plug.
Figure 8:
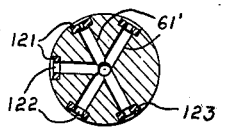
Fig. 8 is a section taken on line 8—8 Fig. 7.
Figure 9:
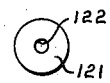
Fig. 9 is an enlarged view of a metering disk.

In Figs. 7, 8 and 9 I have shown an improved plug valve 15' which may be employed in place of the plug 15 and wherein the radial conduits 61' are all the same size, metering disks 121 having central apertures 122 of various sizes being pressed into enlarged portions 123 of the conduits 61'. The plug 15' includes a conduit 62' which functions as does the conduit 62.

From the foregoing description it will be apparent that I have invented a novel fluid control device which is highly efficient for the intended purpose.

Having thus described my invention, I claim:

1. In a fluid control device, a cylinder having a valve member at one end, said valve member being open to said cylinder and including an inlet and an outlet with a valve seat therebetween, a piston in said cylinder and having a valve thereon movable with the piston to engage said seat, a member on said cylinder and having a tapered aperture therein, a plug rotatable in said aperture, said plug having an axial conduit leading from the bottom thereof and terminating short of the top thereof, said plug having a plurality of radial coplanar conduits extending from the outer surface thereof and communicating with said axial conduit, a conduit communicating with the lower end of said cylinder and opening into said tapered aperture adjacent to said radial conduits, said member having a bleed conduit leading from said tapered aperture to the atmosphere, said plug having a radial aperture communicating with the axial aperture in said plug and in alignment with said bleed aperture.

2. In a fluid control device, a housing having a valve member at one end including an inlet and an outlet, a valve seat between said inlet and said outlet, said outlet communicating with said cylinder, a piston in said cylinder, a valve on the lower face of said piston and movable with the piston to engage said valve seat, a cap member on the other end of said cylinder, said cap member having a tapered aperture therein, a plug rotatable in said aperture, said plug having an axial conduit leading from the bottom thereof and terminating short of the top thereof, said plug having a plurality of radial coplanar conduits extending from the outer surface thereof to said axial conduit, a conduit communicating with the lower end of said cylinder below said piston and opening into said tapered aperture adjacent to said radial conduits, said cap having a bleed conduit leading from said tapered aperture to the atmosphere, said plug having a radial aperture communicating with the axial aperture in said plug and in alignment with said bleed aperture.

3. In a fluid control device, a housing including a hollow cylindrical body having a valve member at one end, said valve member including an inlet and an outlet, a valve seat between said inlet and said outlet, said valve member communicating with said cylinder, a piston in said cylinder, a valve on the lower face of said piston and movable with the piston to engage said valve seat, a cap member on the other end of said cylinder, said cap member having a tapered aperture therein, a plug rotatable in said aperture, said plug having an axial conduit leading from the bottom thereof and terminating short of the top thereof, said plug having a plurality of radial coplanar conduits extending from the outer surface thereof to said axial conduit, a conduit communicating with the lower end of said cylinder below said piston, said last mentioned conduit opening into said tapered aperture adjacent to said radial conduits, said cap having a bleed conduit leading from said tapered aperture to the atmosphere, said plug having a radial aperture communicating with the axial aperture in said plug and in alignment with said bleed aperture, said piston being adapted to be shifted by fluid entering said inlet when said bleed aperture is opened to thereby raise said valve member and allow passage of fluid from said inlet to said outlet, said piston descending by gravity upon the closing of said bleed aperture and upon the alignment of one of the coplanar apertures therein with said cylinder conduit and cushion means positioned in the lower end of said cylinder to resiliently retard movement of said piston towards valve closing position.

HARRY J. McCOMBS BURDICK.